(12) United States Patent
Coffey et al.

(10) Patent No.: US 8,943,191 B2
(45) Date of Patent: Jan. 27, 2015

(54) DETECTION OF AN UNRESPONSIVE APPLICATION IN A HIGH AVAILABILITY SYSTEM

(75) Inventors: Michael K. Coffey, Shokan, NY (US); Manjunath B. Muttur, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1215 days.

(21) Appl. No.: 12/061,420

(22) Filed: Apr. 2, 2008

(65) Prior Publication Data

US 2009/0252047 A1 Oct. 8, 2009

(51) Int. Cl.
*G06F 15/173* (2006.01)
*G06F 11/07* (2006.01)
*H04L 12/26* (2006.01)
*G06F 11/20* (2006.01)

(52) U.S. Cl.
CPC ........ *G06F 11/0757* (2013.01); *G06F 11/0748* (2013.01); *G06F 11/076* (2013.01); *H04L 12/2602* (2013.01); *H04L 12/2697* (2013.01); *H04L 43/00* (2013.01); *H04L 43/50* (2013.01); *G06F 11/202* (2013.01); *H04L 43/16* (2013.01)
USPC .......................................... 709/224; 709/228

(58) Field of Classification Search
USPC ........................................................ 709/224
See application file for complete search history.

(56) References Cited

U.S. PATENT DOCUMENTS

| | | | |
|---|---|---|---|
| 5,636,376 A | 6/1997 | Chang | |
| 6,457,143 B1 * | 9/2002 | Yue | 714/43 |
| 6,567,937 B1 * | 5/2003 | Flores et al. | 714/46 |
| 6,772,375 B1 * | 8/2004 | Banga | 714/47 |
| 7,149,928 B2 | 12/2006 | van Os | |
| 7,243,267 B2 | 7/2007 | Klemm et al. | |
| 7,506,360 B1 * | 3/2009 | Wilkinson et al. | 726/3 |
| 2004/0236802 A1 * | 11/2004 | Baratakke et al. | 707/204 |
| 2007/0058531 A1 * | 3/2007 | Dierks et al. | 370/229 |
| 2007/0130324 A1 * | 6/2007 | Wang | 709/224 |
| 2008/0195745 A1 * | 8/2008 | Bowra et al. | 709/231 |

OTHER PUBLICATIONS

Krivokapić et al., "Deadlock detection in distributed database systems: a new algorithm and a comparative performance analysis", The VLDB Journal (1999) 8: 79-100, © Springer-Verlag 1999.
Jovanovic et al., "Precise Alias Analysis for Static Detection of Web Application Vulnerabilities", PLAS'06, Jun. 10, 2006, p. 27, Copyright © 2006 ACM 1-59593-374-3/06/0006, Ontario, Canada.

* cited by examiner

*Primary Examiner* — Viet Vu
*Assistant Examiner* — Herman Belcher
(74) *Attorney, Agent, or Firm* — Fleit Gibbons Gutman Bongini & Bianco PL; Thomas Grzesik (57) ABSTRACT

A method, information processing system, and computer program storage product for determining if an application has become unresponsive. Network traffic at a receiver node is monitored. The receiver node is determined to have generated a window probe response indicating a predetermined window size. A threshold associated with the window size of the receiver node is set in response to the receiver node having generated the window probe response. The window size of the receiver is determined to have been at the predetermined size for at least one of a time period greater than the threshold and a count greater than the threshold. An application associated with the receiver node is classified as unresponsive in response to the window size of the receiver node having been the predetermined size for at least one of a timer period greater than the threshold and a count greater than the threshold.

10 Claims, 5 Drawing Sheets

```
302 ─ 1 0.0 bsdi.1027 > svr4.5555: P 1:1025(1024) ack 1 win 4096
      2 0.191961 (0.1920) svr4.5555 > bsdi.1027: ack 1025 win 4096
      3 0.196950 (0.0050) bsdi.1027 > svr4.5555: . 1025 :2049(1024) ack 1 win 4096
      4 0.200340 (0.0034) bsdi.1027 > svr4.5555: . 2049:3073(1024) ack 1 win 4096
      5 0.207506 (0.0072) svr4.5555 > bsdi.1027: . ack 3073 win 4096
      6 0.212676 (0.0052) bsdi.1027 > svr4.5555: . 3073 :4097(1024) ack 1 win 4096
      7 0.216113 (0.0034) bsdi.1027 > svr4.5555: P 4097 :5121(1024) ack 1 win 4096
      8 0.219997 (0.0039) bsdi.1027 > svr4.5555: P 5121 :6145(1024) ack 1 win 4096
      9 0.227882 (0.0079) svr4.5555 > bsdi.1027: . ack 5121 win 4096
     10 0.233012 (0.0051) bsdi.1027 > svr4.5555: P 6145 :7169(1024) ack 1 win 4096
     11 0.237014 (0.0040) bsdi.1027 > svr4.5555: P 7169 :8193(1024) ack 1 win 4096
     12 0.240961 (0.0039) bsdi.1027 > svr4.5555: P 8193 :9217(1024) ack 1 win 4096
304 ─ 13 0.402143 (0.1612) svr4.5555 > bsdi.1027: . ack 9217 win 0
     14 5.351561 (4.9494) bsdi.1027 > svr4.5555: . 9217 : 9218(1) ack 1 win 4096
     15 5.355571 (0.0040) svr4.5555 > bsdi.1027: . ack 9217 win 0
     16 10.351714 (4.9961) bsdi.1027 > svr4.5555: . 9217 : 9218 (1) ack 1 win 4096
     17 10.355670 ( 0.0040) svr4.5555 > bsdi.1027: . ack 9217 win 0
     18 16.351881 (5.9962) bsdi.1027 > svr4.5555: . 9217 : 9218(1) ack 1 win 4096
     19 16.355849 (0.0040) svr4.5555 > bsdi.1027: . ack 9217 win 0
     20 28.352213 (11.9964) bsdi.1027 > svr4.5555: .9217 : 9218 (1) ack 1 win 4096
     21 28.356178 (0.0040) svr4.5555 > bsdi.1027: . ack 9217 win 0
     22 52.352874 (23.9967) bsdi.1027 > svr4.5555: . 9217 : 9218(1) ack 1 win 4096
     23 52.356839 (0.0040) svr4.5555> bsdi.1027: . ack 9217 win 0
     24 100.354224 (47.9974) bsdi.1027 > svr4.5555: . 9217 : 9218(1) ack 1 win 4096
     25 100.358207 (0.0040) svr4.5555 > bsdi.1027: . ack 9217 win 0
     26 160.355914 (59.9977) bsdi.1027 > svr4.5555: . 9217 :9218 (1) ack 1 win 4096
     27 160.359835 ( 0.0039) svr4.5555> bsdi.1027: . ack 9217 win 0
     28 220.357575 (59.9977) bsdi.1027 > svr4.5555: . 9217:9218(1) ack 1 win 4096
     29 220.361668 (0.0041) svr4.5555 > bsdi.1027: . ack 9217 win 0
     30 280.359254 (59.9976) bsdi.1027 > svr4.5555: . 9217: 9218(1) ack 1 win 4096
     31 280.363315 ( 0.0041) svr4.5555 > bsdi.1027: . ack 9217 win 0
```

DETECTION OF AN UNRESPONSIVE APPLICATION IN A HIGH AVAILABILITY SYSTEM

FIELD OF THE INVENTION

The present invention generally relates to the field of cluster multi-processing, and more particularly relates to managing and detecting unresponsive applications in a cluster multi-processing environment.

BACKGROUND OF THE INVENTION

Typically, in a High Availability Cluster, there is a group of loosely coupled nodes that all work together to ensure a reliable service to clients. The high availability is achieved by continuously monitoring state of applications and all the resources on which the application depends to be alive. If an application abnormally terminates or if the operating system suddenly fails then the applications are automatically restarted on the backup server. This process of restarting the application on a backup server is herein referred to as "fallover".

As can be seen, the goal of a High Availability System such as HACMP™ ("High Availability Cluster Multi-Processing") provided by International Business Machines ("IBM") of Armonk, N.Y., is to reduce application downtime by continuously monitoring applications for any failure and automatically restore applications in a backup server after a failure. An application crash can be detected by monitoring its resources such as a process ID ("PID"), log message, and connection creation. There are generally two types of application failures that can lead to a complete failure of a service. The first failure type is an application crash wherein the service gets terminated abnormally and unexpectedly. The second failure type is when an application hangs/freezes wherein the service appears to be running but has stopped responding.

Detecting a crashed application is relatively simple, whereas detecting a hung or unresponsive application can be more challenging. For example, when a server application is in a non-responsive state, resources used by the application, such as a PID, memory, CPU usage, and the like usually appear to be normal and the application is still able to accept new connections. Conventional methods for monitoring the availability of an application generally cannot be used to detect a non-responsive condition of a server application. As a result, high availability systems generally cannot detect a hung application effectively.

Therefore a need exists to overcome the problems with the prior art as discussed above.

SUMMARY OF THE INVENTION

A method for determining if an application has become unresponsive is disclosed. The method includes monitoring network traffic at a receiver node. The receiver node is determined, in response to monitoring network traffic at the receiver node, to have generated a window probe response indicating a predetermined window size determining. A threshold associated with the window size of the receiver node is set in response to determining that the receiver node generated a window probe response indicating a predetermined window size. The window size of the receiver is determined to have been at the predetermined size for at least one of a time period greater than the threshold and a count greater than the threshold. An application associated with the receiver node is classified as unresponsive in response to determining that the window size of the receiver has been the predetermined size for at least one of a timer period greater than the threshold and a count greater than the threshold.

In another embodiment, an information processing system for determining if an application has become unresponsive is disclosed. The information processing system includes a memory and a processor that is communicatively coupled to the memory. The information processing system further includes an application monitor that is communicatively coupled to the memory and the processor. The application monitor is adapted to monitor network traffic at a receiver node. The receiver node is determined, in response to monitoring network traffic at the receiver node, to have generated a window probe response indicating a predetermined window size determining. A threshold associated with the window size of the receiver node is set in response to determining that the receiver node generated a window probe response indicating a predetermined window size. The window size of the receiver is determined to have been at the predetermined size for at least one of a time period greater than the threshold and a count greater than the threshold. An application associated with the receiver node is classified as unresponsive in response to determining that the window size of the receiver has been the predetermined size for at least one of a timer period greater than the threshold and a count greater than the threshold.

In yet another embodiment, a computer program storage product for determining if an application has become unresponsive is disclosed. The computer program storage product includes instructions for monitoring network traffic at a receiver node. The receiver node is determined, in response to monitoring network traffic at the receiver node, to have generated a window probe response indicating a predetermined window size determining. A threshold associated with the window size of the receiver node is set in response to determining that the receiver node generated a window probe response indicating a predetermined window size. The window size of the receiver is determined to have been at the predetermined size for at least one of a time period greater than the threshold and a count greater than the threshold. An application associated with the receiver node is classified as unresponsive in response to determining that the window size of the receiver has been the predetermined size for at least one of a timer period greater than the threshold and a count greater than the threshold.

One advantage of the various embodiments of the present invention is that unresponsive applications can be detected in a High Availability operating environment. Network traffic between sender nodes and receiver nodes can be monitored for detecting characteristics or an unresponsive application. Various embodiments of the present invention leverage flow control mechanisms, thereby detecting when an application has become hung/unresponsive. In other words, the various embodiments of the present invention can detect a hung or unresponsive application without a client having to initiate a closure operation.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Computer Cluster Environment

Figure 1:
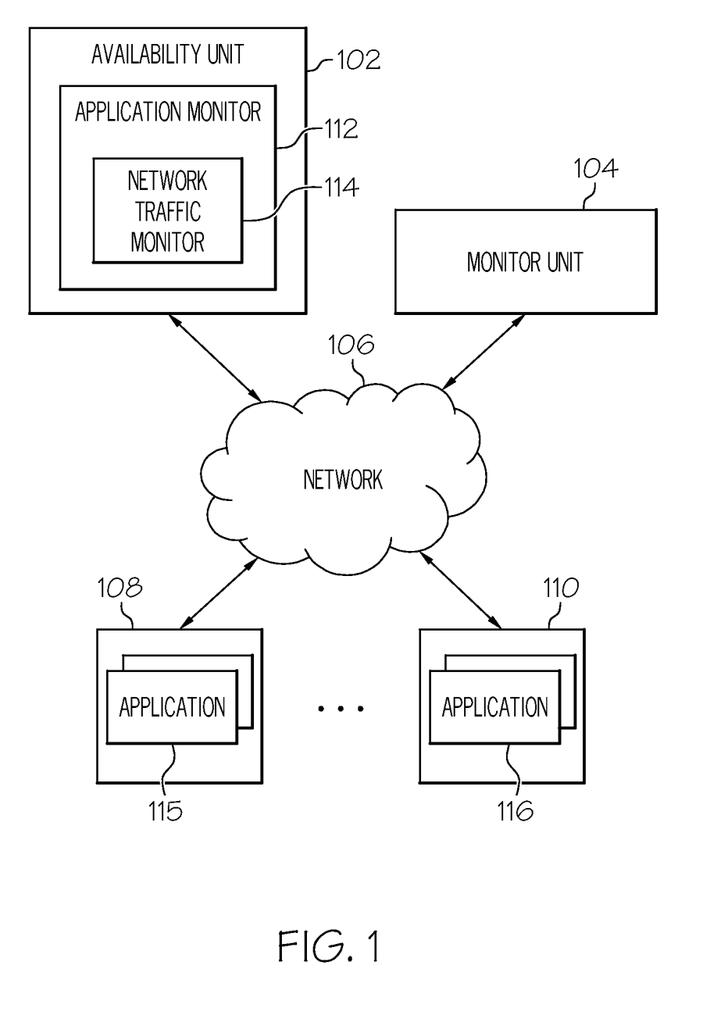
FIG. 1 is a block diagram illustrating one example of cluster multi-processing environment according to one embodiment of the present invention.

FIG. 1 is a block diagram illustrating a system architecture for a node cluster according to one embodiment. An availability unit 102 provides availability and recovery functions (such as a recovery process) for nodes 108, 110 in a cluster on a network 106. The HACMP™ product of IBM is one example of an availability unit 102. Clustering servers enables parallel access to data, which can help provide the redundancy and fault resilience required for business-critical applications. Clustering applications, such as HACMP™ provide tools to help install, configure and manage clusters in a highly productive manner. HACMP™ provides monitoring and recovery of clustered computer resources for use in providing data access and backup functions (e.g., a mission critical database). HACMP™ also enables server clusters to be configured for application recovery/restart to provide protection for business-critical applications through redundancy. For example, the first node 108 can be a primary server that provides services to the nodes 108, 110. If this node 108 fails, the availability unit 102 performs recovery functions and moves the workload of this node 108 to the second node 110 which can be a backup server.

In one embodiment, the availability unit 102 includes an application monitor 112 that comprises a network traffic monitor 114. The application monitor 112 monitors applications 115, 116 within the nodes 108, 100. The application monitor 112, via the network traffic monitor 114, determines when an application 115, 116 has become hung or unresponsive so that a recovery operation can be triggered for the application 115, 116. The application monitor 112 and the network traffic monitor 114 are discussed in greater detail below.

A monitor unit 104 provides monitoring functions (such as a monitoring process) for the nodes 108, 110 in the cluster on network 106. The RSCT product of IBM is one example of a monitor unit 104. RSCT provides error detection for TCP/IP based node networks. RSCT is a clustering infrastructure that can be used by HACMP™ for providing higher-level recovery functions. RSCT sends messages, known as heartbeat messages, across each network interface connected to the network. When heartbeat messages are no longer received via a particular network interface, that network interface is considered dead or unconnected It should be noted that while only two nodes 108, 110 are shown in FIG. 1, the availability unit 102 and monitor unit 104 support a cluster comprising more than two nodes. In further embodiments, any number of cluster nodes 108 through 110 is supported. In some embodiments, the computer systems of availability unit 102, monitor unit 104, and nodes 108, 110 include one or more Personal Computers ("PCs") (e.g., IBM or compatible PC workstations running the Microsoft Windows® operating system, Macintosh® nodes running the Mac OS operating system, or equivalent), Personal Digital Assistants ("PDAs"), game consoles or any other information processing devices. Additionally, in some embodiments, the computer systems of availability unit 102, monitor unit 104, and nodes 108, 110 include a server system (e.g., IBM workstations and servers running the Linux operating system). In one embodiment, the availability unit 102 and the monitor unit 104 are processes running on one of the nodes 108, 110 of the cluster, or on one or more additional nodes or servers that are connected to the network 106.

In the one embodiment, the network is a packet switched network utilizing the Internet Protocol (or "IP"). The packet switched network is a wide area network ("WAN"), such as the global Internet, a private WAN, a local area network ("LAN"), a telecommunications network, or any combination of the above-mentioned networks. In further embodiments, any protocol can be used and the network can be a wired network, a wireless network, a broadcast network, a point-to-point network, or a circuit switched network (e.g., the Public Service Telephone Network).

Figure 2:
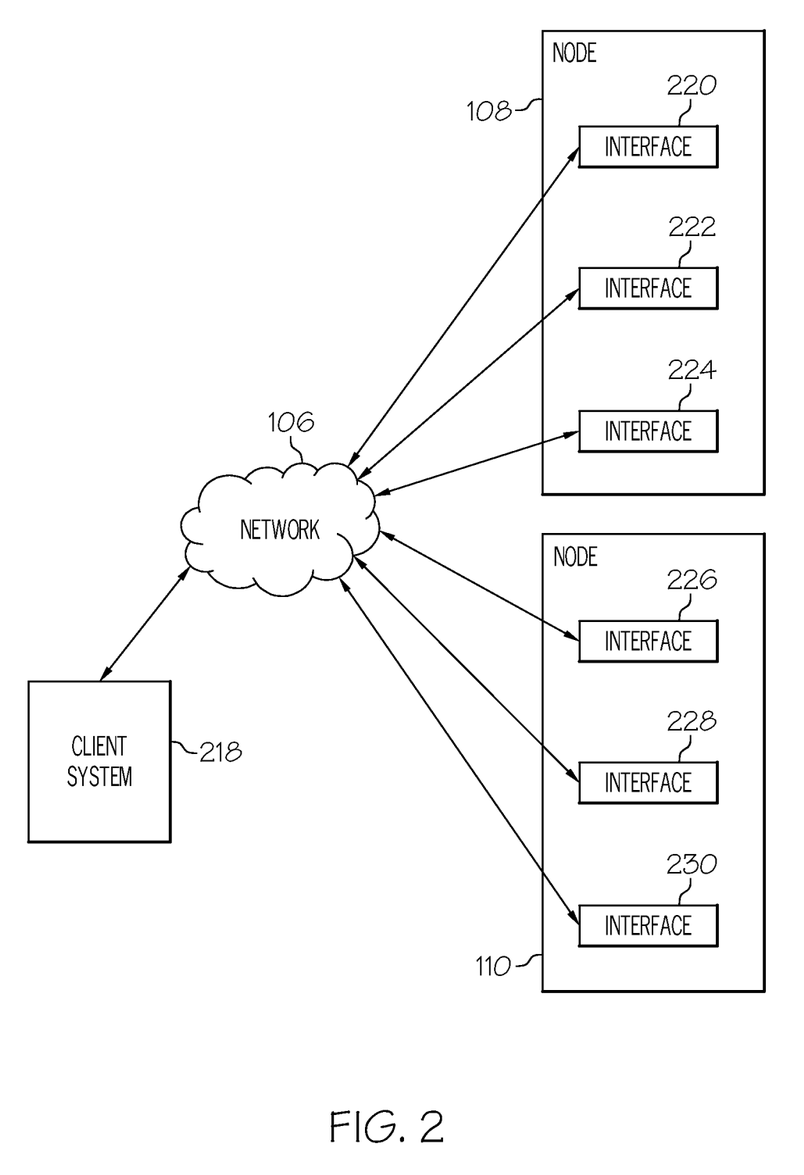
FIG. 2 is a block diagram illustrating a more detailed view of a computer cluster.

FIG. 2 is a more detailed block diagram of a portion of the computer cluster of FIG. 1. FIG. 2 shows the client system 218 communicatively coupled to at least one of the nodes 108, 110 of FIG. 1 connected to the network 106. As shown, in this illustrative embodiment node 108 is connected to the network 106 via three network interface adapters 220, 222, 224. Similarly, node 110 is connected to the network 106 via three network interface adapters 226, 228, 230. The client system 218 communicates with the nodes 108, 110 through one of the interfaces 220 through 230. A network interface adapter, often abbreviated as NIC, is an expansion board, PCMCIA card, built-in device or some other module coupled to a computer so as to interface the computer with a network 106. Most NICs are designed for a particular type of network, protocol, and media, although some can serve multiple networks. One example of a NIC is an Ethernet adapter for connecting a computer to a network using the TCP/IP protocol. In this document, the term "network interface" is used interchangeably with "network interface adapter," "adapter," "network interface card" and "NIC."

The nodes 108, 110 are nodes of the cluster. Thus, the network interfaces 220 through 230 are grouped into nodes of the cluster. For example, the network interfaces 220, 222, 224 are grouped into a first node 108, while network interfaces 226, 228, 230 are grouped into a second node 110. While the embodiment illustrated in FIG. 2 has three network interfaces per node (or computer) connected to one network, further embodiments of the present invention can have any number of network interfaces per node, different numbers of network interfaces for different nodes, and network interfaces connected to any number of networks. In various embodiments, each node 108, 110 has at least two network interfaces connected to each network in order to provide the redundancy that is required for recovery operations. Further, although FIG. 2 shows only two nodes, the present invention supports any number of nodes.

Detection of a Hung/Unresponsive Application in a High Availability Operating Environment As discussed above, conventional methods for monitoring the availability of an application in a High Availability operating environment generally cannot be used to detect a nonresponsive condition of a server application. Typically, High Availability systems address the problem of detecting a hung application by expecting vendors to provide their own monitoring agents that communicate with the vendor application through a customized API. Alternatively, current High Availability systems also manage hung application detection by having a system administrator manually intervene so that the application can recover from the hung situation. However, these solutions compromise the very goal/objective of High Availability systems.

Furthermore, solutions such as those discussed in U.S. Pre-Grant Publication No. 20070130324, which is hereby incorporated by reference in its entirety, for detecting non-responsive applications in a TCP-base network are also problematic for High Availability operating environments. For example, U.S. Pre-Grant Publication No. 20070130324 detects a hung application by identifying an incomplete close sequence of a TCP connection between the hung application and client. However, this solution is generally not effective in High Availability Systems because a client is required to initiate a closure of TCP connection with the hung application. This is problematic because not all client applications are designed to initiate a close sequence when the server becomes unresponsive. Additionally, even if the client initiates a close sequence, this generally occurs only after noticing a long period of server inactivity. A user, therefore, experiences the service/business downtime until the client initiates a close sequence.

Various embodiments of the present invention, on the other hand, monitor network traffic activity of the applications to determine when an application has become hung/non-responsive. For example, when any application goes into a sleep state or becomes too slow the TCP traffic associated with the application exhibits packet activity that is characteristic of this state. The application monitor 112 via the network traffic monitor 114 detects this packet activity by leveraging flow control mechanisms, thereby detecting when an application has become hung/unresponsive. In other words, the various embodiments of the present invention can detect a hung or unresponsive application without a client having to initiate a closure operation.

This invention leverages a specific flow control mechanism of TCP to detect an unresponsive application. For example, the application monitor 112 via the network traffic monitor 114 continuously monitors network traffic such as TCP/IP traffic between clients (e.g., applications 115, 116) and their servers (e.g., computing nodes 108, 110) to determine when an application is in an unresponsive state. In one embodiment, the network traffic monitor 114 of the application monitor 112 monitors the TCP/IP traffic between an application 115 and a node 108 for window probes. Window probes are generally sent from the node (e.g., the sender) to a receiver such as an application 115 to determine if the receive buffer has available space to receive packets. The application can response back to the sender indicating how many packets the receive buffer can hold If the receive buffer is full and cannot accept any more packets, the receiver responds with a window size of 0, indicating that the receive buffer is full. The sender uses a persist time that causes the sender to periodically query the window size of the receive buffer to determine if the window size has increased. In one embodiment, once the traffic monitor 114 detects that a sender has sent out a window probed and has received a response back indicating a window size of 0, the application monitor 112 sets a timer. If the timer expires without the receiver changing its window size of 0, the network monitor determines that the application 115 is a hung/unresponsive state. The application monitor 112 can then notify an administrator accordingly. Also, the availability unit 102 can perform recovery operations so that the application is restarted on the same node or restarted on a different node.

It should be noted that an application may be slow to respond and therefore cause the timer to expire without a window size increase from 0. Therefore, in one embodiment, the timer set by the application monitor 112 is adjustable. Therefore, the application monitor 112 can automatically adjust the timer according to the application to ensure that an application is in a hung/unresponsive state. The timer can also be adjusted by a human user as well.

Figure 3:
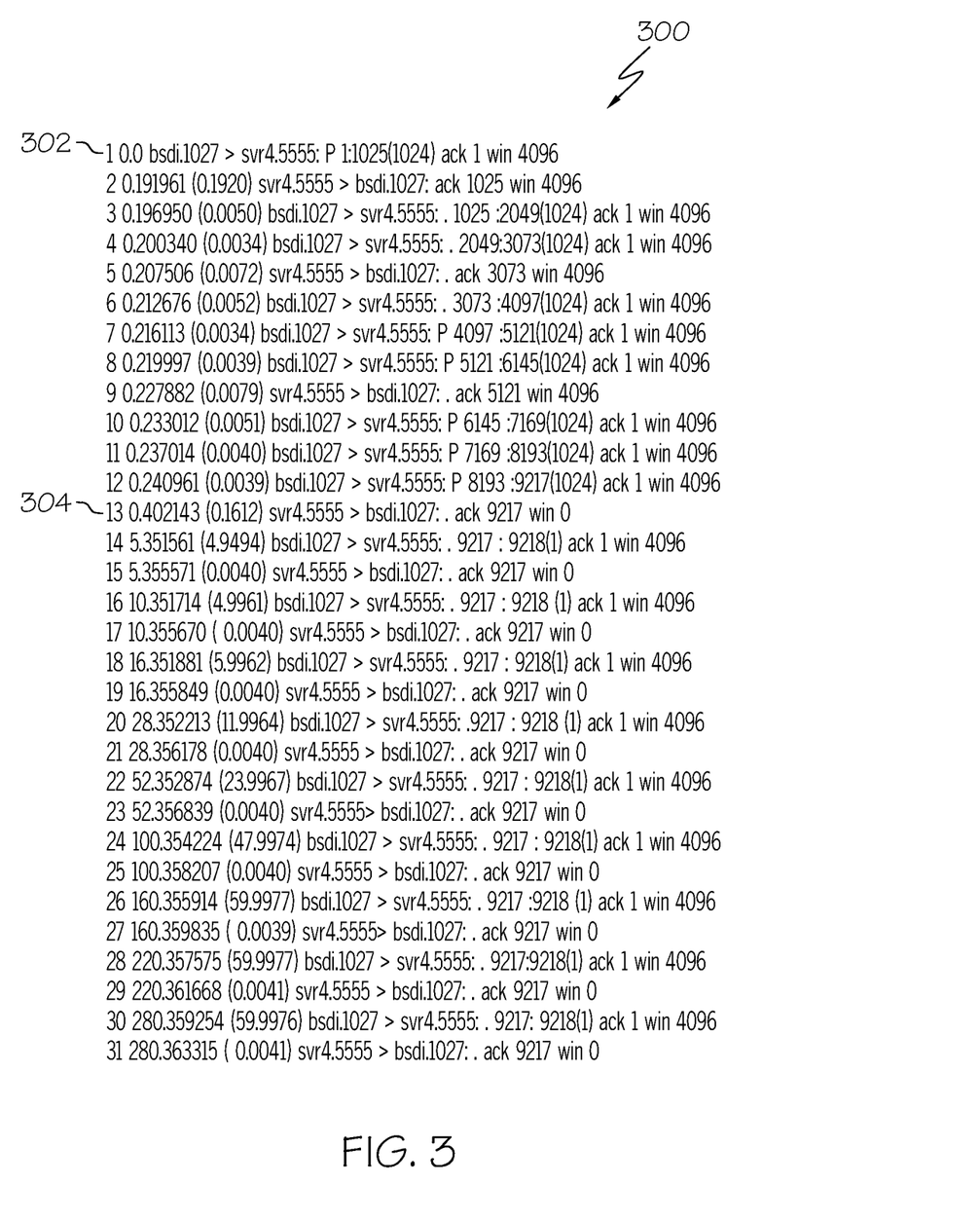
FIG. 3 illustrates one example of a tcpdump file according to one embodiment of the present invention.

In another embodiment, instead of or in addition to using a timer, the network traffic monitor 114 can set a threshold with respect to detected zero window updates. For example, the threshold can be set so that when a given number of consecutive zero window updates are detected the application 115 is determined to be in a hung/unresponsive state. FIG. 3 shows one example of a tcpdump output file 300. In particular, FIG. 3 shows a receiver's response to multiple window probes. For example, line 1 302 shows that the receiver responded to a window probed with "win 4096". However, in line 13 304, the receiver acknowledges the previous four data segments, but advertises a window of 0. This causes the sender to stop transmitting data to the receiver.

The sender then sets a persist timer and if the sender fails to receive a window update when the timer expires, the sender probes the empty window to see if a window update has been lost. Since the receiver process is asleep, the 9216 bytes of data are buffered by TCP, waiting for the application to issue a read. The characteristic of the persist state is that TCP never gives up sending window probes. As discussed above, once a zero window update is detected by the network traffic monitor 114, the application monitor 112 can set a timer. Once the time expires without the receiver increasing its window size, the application monitor can determine that the application 115 is in a hung/unresponsive state. Alternatively or in addition to the timer, the application monitor 112 can set a threshold so that if a given number of consecutive zero window updates have occurred, the application monitor 112 can determine that the application is in a hung/unresponsive state.

Figure 4:
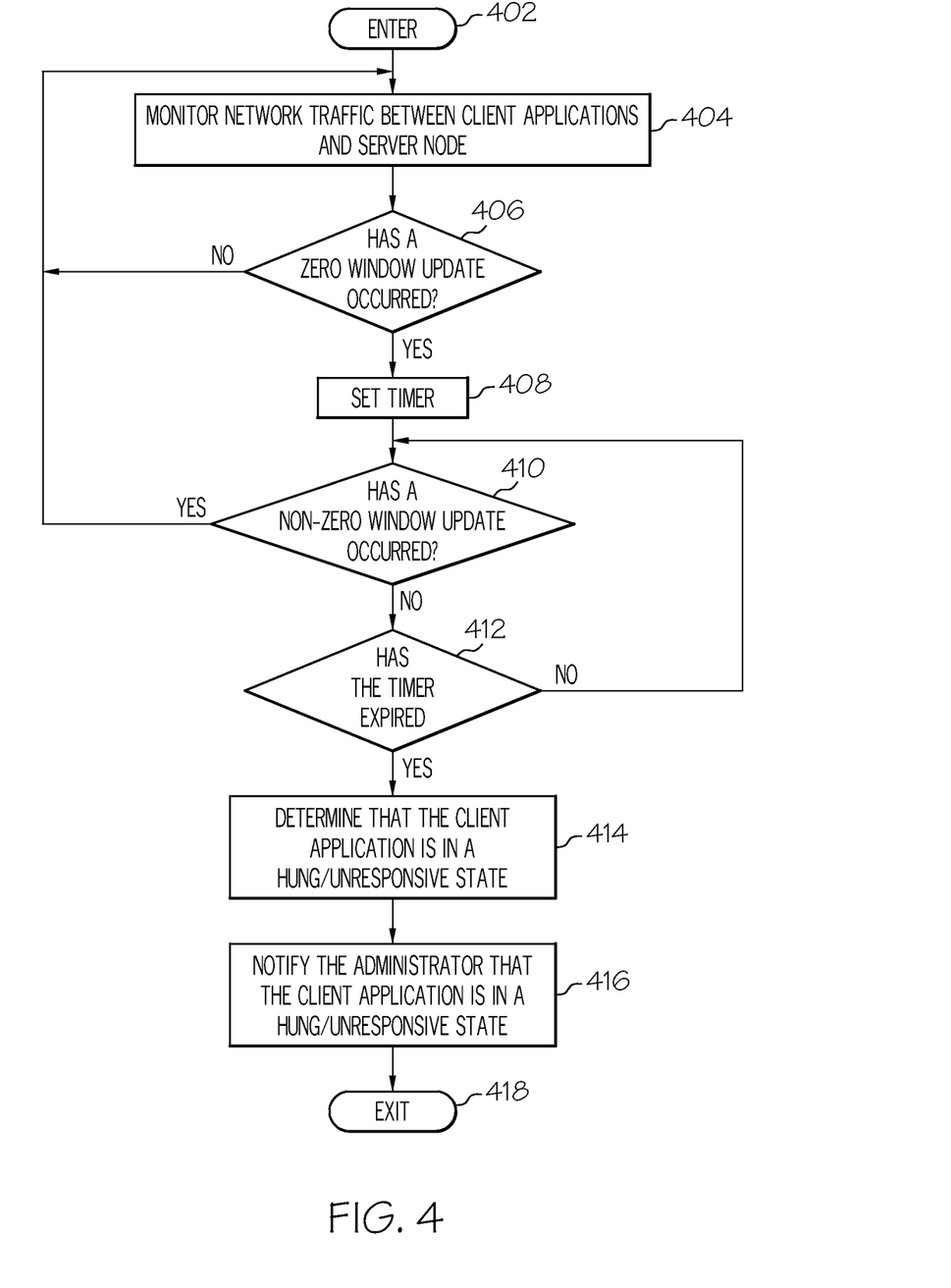
FIG. 4 is an operational flow diagram illustrating an overall process of detecting an unresponsive application in a High Availability operating environment according to one embodiment of the present invention.

Operational Flow for Detecting an Unresponsive Application in a High Availability Operating Environment FIG. 4 is an operational flow diagram illustrating one example of detecting an unresponsive application within a High Availability operating environment. The operational flow diagram of FIG. 4 begins at step 402 and flows directly to step 404. The application monitor 112, at step 404, monitors the network traffic between a client application 115 and a server node 108. For example, the application monitor 112, via the network traffic monitor 114, monitors the network traffic for windows probes and window update messages.

The application monitor 112, at step 406, determines if a zero window update has been sent by a receiver in response to a window probe being sent by a sender. It should be noted that the client application 115 and the server node 108 can each respectively be a "sender" and a "receiver". If the result of this determination is negative, the application monitor continues to monitor the application traffic at step 404. If the result of this determination is positive, the application monitor 112 sets a timer, as discussed above. Alternatively, the application monitor 112 can set a threshold count for zero window updates, as discussed above.

The application monitor 112, at step 410, determines if a non-zero window update has occurred. If the result of this determination is positive, the application monitor 112 continues to monitor the network traffic at step 402. If the result of this determination is negative, the application monitor, at step 412, determines if the timer has expired. If the result of this determination is negative, the application monitor continues to determine if a non-zero window update has occurred at step 410. If the result of this determination is positive, the application monitor, at step 414, determines that the receiver, which is the client application 115 in this example, is in a hung/unresponsive state. The application monitor 112, at step 416, notifies an administrator that the client application 115 is in the hung/unresponsive state. The control flow exits at step 418.

Example of a Node in a Cluster

Figure 5:
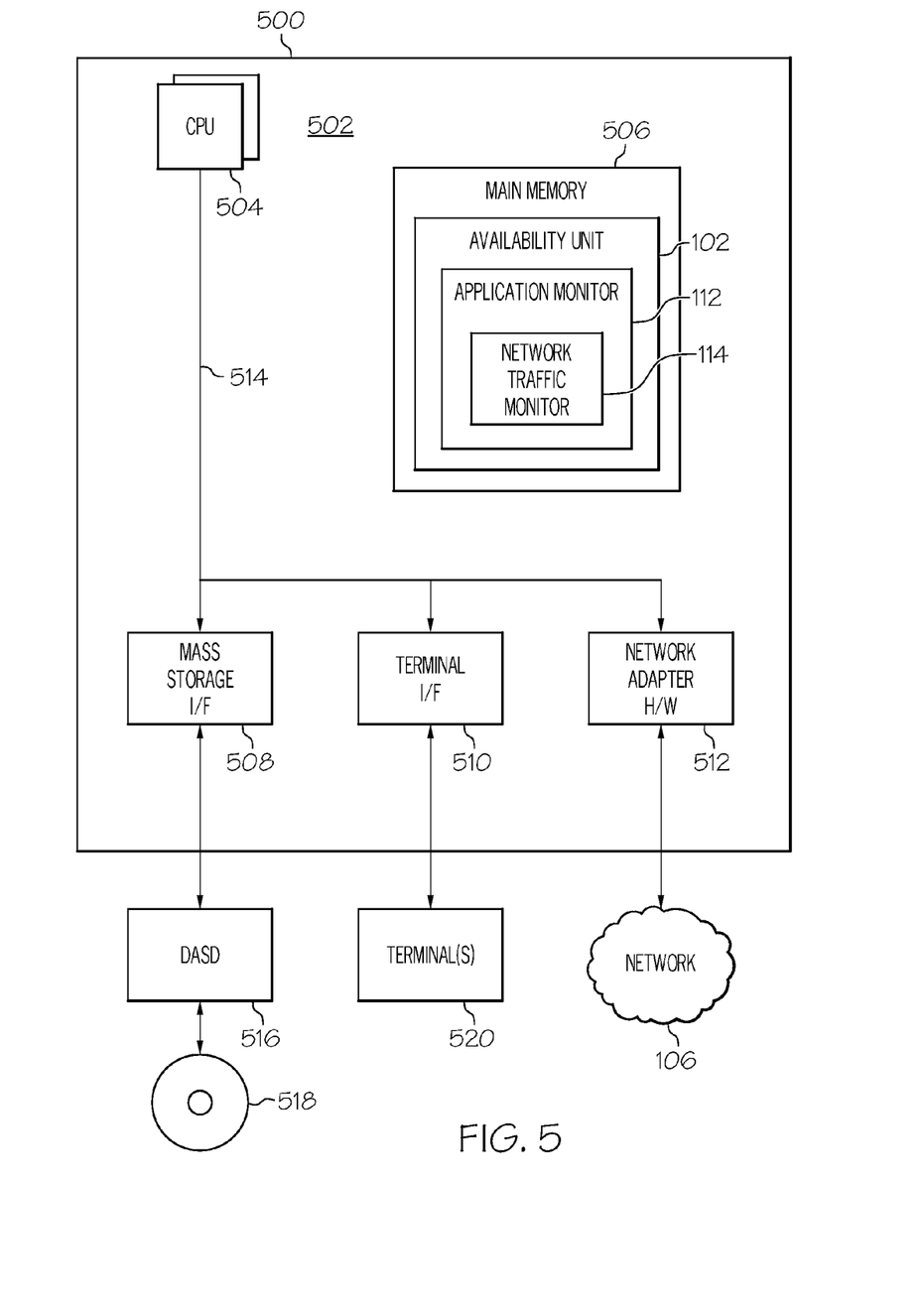
FIG. 5 is a block diagram illustrating a detailed view of a computing node according to an embodiment of the present invention.

FIG. 5 is a block diagram illustrating a more detailed view of node 500, such as the node 108, 110 shown in FIG. 1, according to one embodiment of the present invention. The node 500 is based upon a suitably configured processing system adapted to implement one embodiment of the present invention, according to the present example. Any suitably configured processing system is similarly able to be used as the node 500 by various embodiments of the present invention such as a personal computer, a workstation, or the like.

The node 500 includes a computer 502. The computer 502 has a processor 504 that is connected to a main memory 506, mass storage interface 508, terminal interface 510, and network adapter hardware 512. A system bus 514 interconnects these system components. The mass storage interface 508 is used to connect mass storage devices, such as data storage device 516, to the node 500. One specific type of data storage device is a data drive capable of writing to/reading from a computer readable medium such as (but not limited to) a floppy disk, flash memory, or CD/DVD 518. Another type of data storage device is a data storage device configured to support, for example, NTFS type file system operations or any other type of file system operations.

The main memory 506, in one embodiment, includes the availability unit 102 and the application monitor 112 (including the network traffic monitor 114), which have been discussed above. The main memory 506, in one embodiment, can also include the monitor unit 104. Although illustrated as concurrently resident in the main memory 506, it is clear that respective components of the main memory 506 are not required to be completely resident in the main memory 506 at all times or even at the same time. In one embodiment, the node 500 utilizes conventional virtual addressing mechanisms to allow programs to behave as if they have access to a large, single storage entity, referred to herein as a computer system memory, instead of access to multiple, smaller storage entities such as the main memory 506 and data storage device 516. Note that the term "computer system memory" is used herein to generically refer to the entire virtual memory of the node 500.

Although only one CPU 504 is illustrated for computer 502, computer systems with multiple CPUs can be used equally effectively. Various embodiments of the present invention further incorporate interfaces that each includes separate, fully programmed microprocessors that are used to off-load processing from the CPU 504. Terminal interface 410 is used to directly connect one or more terminals 520 to computer 502 to provide a user interface to the computer 502. These terminals 520, which are able to be non-intelligent or fully programmable workstations, are used to allow system administrators and users to communicate with the node 500. The terminal 520 is also able to consist of user interface and peripheral devices that are connected to computer 502 and controlled by terminal interface hardware included in the terminal I/F 510 that includes video adapters and interfaces for keyboards, pointing devices, and other devices/interfaces.

An operating system (not shown) included in the main memory is a suitable multitasking operating system such as the AIX®, Linux, UNIX, Windows XP, and Windows Server 2001 operating systems. Various embodiments of the present invention are able to use any other suitable operating system. Some embodiments of the present invention utilize architectures, such as an object oriented framework mechanism, that allow instructions of the components of operating system (not shown) to be executed on any processor located within the node 500. The network adapter hardware 512 such as the interface 216 discussed above is used to provide an interface to the network 106. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a program product via CD or DVD, e.g. CD 518, CD ROM, or other form of recordable media, or via any type of electronic transmission mechanism.

Non-Limiting Examples

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for determining if an application has become unresponsive, the method comprising:
   monitoring network traffic at a receiver node;
   receiving, based on monitoring network traffic at a receiver node, a window probe response comprising a window size, the window size indicating a number of packets a receive buffer at the receiver node is currently able to hold;
   comparing the window size of the window probe response to a predetermined window size;
   determining, based on the comparing, that the window size of the window probe response matches the predetermined window size;
   setting, based on determining that the window size of the window probe response matches the predetermined window size, at least one of a time threshold and a count threshold associated with the window size of the receiver node;
   receiving, based on setting the at least one of the time threshold and the count threshold, a set of additional window probe responses, wherein each of the set of additional window probe responses comprises a window size update indicating a current window size of the receive buffer;
   determining, based on receiving the set of additional window probe responses, at least one of
      that the window size of the receiver node has been at the predetermined window size for a time period that is one of greater than and equal to the time threshold, and
      that a number of window size updates in the set of additional window probe response, indicating that the window size of the receiver node remains at the predetermined window size, is one of greater than and equal to the count threshold; and
   classifying, based on the determining, an application associated with the receiver node as unresponsive.

2. The method of claim 1, wherein the network traffic is Transmission Control Protocol/Internet Protocol traffic.

3. The method of claim 1, wherein the predetermined window size is 0.

4. The method of claim 1, wherein the time threshold is adjustable for different applications at the receiver node.

5. The method of claim 1, further comprising:
   restarting, based on classifying the application associated with the receiver node as unresponsive, the application on one of the receiver node and a different node.

6. An information processing system for determining if an application has become unresponsive, the information processing system comprising:
   a memory;
   a processor communicatively coupled to the memory; and
   an application monitor communicatively coupled to the memory and the processor, wherein the application monitor is configured to perform a method comprising:
      monitoring network traffic at a receiver node;
      receiving, based on monitoring network traffic a receiver node, a window probe response comprising a window size, the window size indicating a number of packets a receive buffer at the receiver node is currently able to hold;
      comparing the window size of the window probe response to a predetermined window size;
      determining, based on the comparing, that the window size of the window probe response matches the predetermined window size;
      setting, based on determining that the window size of the window probe response matches the predetermined window size, at least one of a time threshold and a count threshold associated with the window size of the receiver node;
      receiving, based on setting the at least one of the time threshold and the count threshold, a set of additional window probe responses, wherein each of the set of additional window probe responses comprises a window size update indicating a current window size of the receive buffer;
      determining, based on receiving the set of additional window probe responses, at least one of
         that the window size of the receiver node has been at the predetermined window size for a time period that is one of greater than and equal to the time threshold, and
         that a number of window size updates in the set of additional window probe responses, indicating that the window size of the receiver node remains at the predetermined window size, is one of greater than and equal to the count threshold; and
      classifying, based on the determining, an application associated with the receiver node as unresponsive.

7. The information processing system of claim 6, further comprising:
   restarting, based on classifying the application associated with the receiver node as unresponsive, the application on one of the receiver node and a different node.

8. A tangible non-transitory computer program storage product for determining, with an information processing system, if an application has become unresponsive, the computer program storage product comprising instructions for:
   monitoring network traffic at a receiver node;
   receiving, based on monitoring network traffic a receiver node, a window probe response comprising a window size, the window size indicating a number of packets a receive buffer at the receiver node is currently able to hold;
   comparing the window size of the window probe response to a predetermined window size;
   determining, based on the comparing, that the window size of the window probe response matches the predetermined window size;

setting, based on determining that the window size of the window probe response matches the predetermined window size, at least one of a time threshold and a count threshold associated with the window size of the receiver node;

receiving, based on setting the at least one of the time threshold and the count threshold, a set of additional window probe responses, wherein each of the set of additional window probe responses comprises a window size update indicating a current window size of the receive buffer;

determining, based on receiving the set of additional window probe responses, at least one of     that the window size of the receiver node has been at the predetermined window size for a time period that is one of greater than and equal to the time threshold, and     that a number of window size updates in the set of additional window probe response, indicating that the window size of the receiver node remains at the predetermined window size, is one of greater than and equal to the count threshold; and classifying, based on the determining, an application associated with the receiver node as unresponsive.

9. The tangible non-transitory computer program storage product of claim 8, wherein the time threshold is adjustable for different applications at the receiver node.

10. The tangible non-transitory computer program storage product of claim 8, further comprising instructions for:

restarting, based on classifying the application associated with the receiver node as unresponsive, the application on one of the receiver node and a different node.

* * * * *